Nov. 27, 1956  T. A. WILSON ET AL  2,771,735
METHOD OF WELDING THE ENDS OF A CHAIN LINK WHEREIN
INITIAL POINT CONTACT IS OBTAINED BETWEEN THE ENDS
Filed Oct. 28, 1953
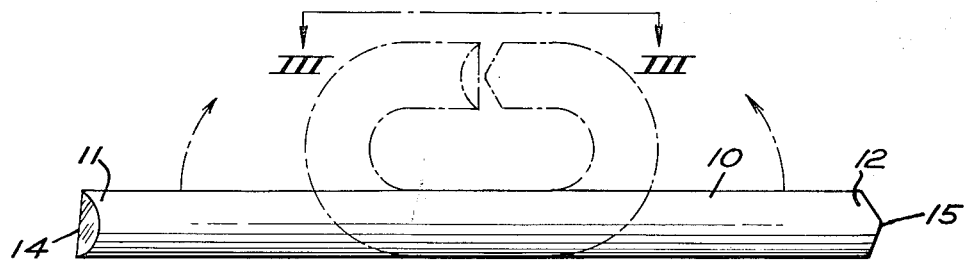
Fig. 1
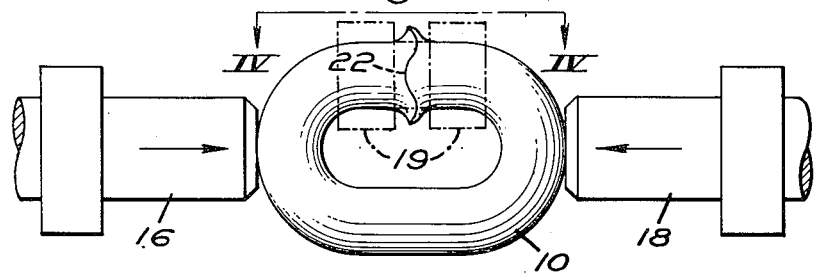
Fig. 2
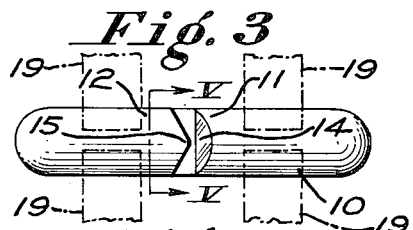
Fig. 3
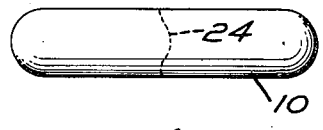
Fig. 4
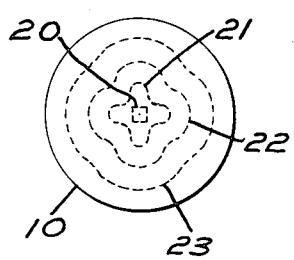
Fig. 6
Fig. 5
INVENTORS
THOMAS A. WILSON,
HUMPHREY F. PARKER
RAYMOND J. KIEFFER
ROBERT T. GILLETTE
BY: Beau, Brooks, Buckley & Beau,
ATTORNEYS.

United States Patent Office 2,771,735
Patented Nov. 27, 1956

2,771,735

METHOD OF WELDING THE ENDS OF A CHAIN LINK WHEREIN INITIAL POINT CONTACT IS OBTAINED BETWEEN THE ENDS

Thomas A. Wilson, Kenmore, Humphrey F. Parker, Buffalo, Raymond J. Kieffer, Tonawanda, and Robert T. Gillette, Scotia, N. Y., assignors to Columbus McKinnon Chain Corporation, Tonawanda, N. Y.

Application October 28, 1953, Serial No. 388,709

2 Claims. (Cl. 59—35)

This invention relates to chain manufacture, and more particularly to so-called electric resistance butt-welded chain link manufacture, and the products thereof.

It is now known to those skilled in the art that in electric butt welding of bent chain link blanks, if the conjoining ends of the blanks are provided in the form of ordinary flat substantially parallel faces, the welding of heat is nonuniformly distributed in the weld zone, and the parts first contacting are often "burned" and foreign matter is sometimes entrapped in the weld, so that the strength of the link at the welded joint may be reduced. This is particularly true in links made from the larger size wire or rods, and also when high carbon steel or certain alloy steels, such as those containing nickel, molybdenum, chrome, or manganese are used. When such steels are used the tolerances in the welding temperature are very limited, and therefore the welding temperature must be kept uniform throughout the weld zone within narrow limits in order to produce satisfactory welds.

Previously it has been discovered that if the link blanks are formed with ends so shaped that the cross-sectional areas gradually decrease from the body part of the blank to the tips of their ends, such as in V shapes or cone shapes or the like as disclosed in U. S. Patent 2,021,157 for example, the welding action will commence at the center of the joint and will spread progressively outwardly therefrom until the entire sectional area of the blank is welded. U. S. Patent 2,025,557 discloses still another form of the prior art such as is referred to herein. However, such processes of the prior art have been found to involve certain difficulties and disadvantages with respect to maintenance of the abutting ends of the link in true alignment as pressures are applied to force them into the finished welds; and it is an object of the present invention, which has resulted from continuation of the research work out of which the aforesaid U. S. patents resulted, to provide an improved end face form and relationship of the conjoining ends of the link blank, to avoid the difficulties and disadvantages of the prior art.

Another object of the present invention is to provide, as a result of a novel resistance butt-welding technique, a novel and improved form of weld having superior strength and providing improved reinforcement for the finished chain link form.

Another object of the invention is to provide a chain link blank having similarly ridge-shaped but transversely disposed ends, which when brought together by pressure under welding temperature conditions will weld from the center outwardly in novel and improved manner.

Another object has been to provide a chain link blank as aforesaid which may be conveniently produced on the usual chain forming machine.

Other objects and advantages of the invention will appear from the specification hereinafter.

Briefly stated, the objects of the invention may be attained by providing a chain link blank having opposing V-shaped ends formed so that their apexes lie in substantially transverse planes, so that when the blank ends are forced together and welded to form the link, the finished weld is of sinuous plane form.

In the drawing:

Fig. 1 is a side elevation of a chain link blank of the invention, illustrated in broken lines as being bent into link form preliminary to the welding operation thereon;

Fig. 2 is a view of the link at the end of the welding operation;

Fig. 3 is an edge view of the blank prior to welding;

Fig. 4 is a similar view of the blank after welding;

Fig. 5 is a fragmentary section taken along line V—V of Fig. 3; and

Fig. 6 is a sectional view, on an enlarged scale showing diagrammatically the progress of a butt-welding operation of this invention.

As shown in Figs. 1 and 3, the link blank 10 is provided with ends 11 and 12 which are substantially V-shaped in formation, but the ends 11 and 12 are so formed that the apex edges 14—15 thereof lie in transverse planes coincident with the central axis of the blank. Thus, when the blank is bent into the form of a link as shown by broken lines in Fig. 1, and in Fig. 3, the apex edges lie in opposed right angle relation. By making the ends of the link blanks V-shaped, the cross-sectional area of each will thus gradually increase from the apex thereof to the full body area of the stock.

The V-shaped ends of the link blanks may be made in any one of a number of well-known ways, as for instance, by machining, grinding, forging, or shearing. Since the stock from which such blanks are made is usually fed to the chain link forming machine, and since blanks for chain links are usually sheared during their feed to such machines, it may be preferable to form the link blank ends by shearing. As shown in Fig. 1, when the link blank 10 is cut out of straight rod stock and "chisel" or ridge-shaped at its ends while in straight bar form, it is essential that the end shapes thereof be canted as shown at the opposite ends of the straight bar stock piece in Fig. 1, in order to compensate for unequal distortion of the stock metal incidental to subsequent bending thereof into link form as shown by broken lines in Fig. 1. If the ends of the stock piece are not so cut in canted attitude relative to the longitudinal axis of the stock piece, they will not pull around into the squarely opposed attitudes thereof as shown in broken lines in Fig. 1. Furthermore, is has been determined that the apex portions 14—15 of the link blank are preferably of flattened edge forms as shown in the drawing. This provides for a first "spot" contact as indicated at 20, Fig. 6, between the conjoining end portions at the center of the proposed weld and avoids overburning of the metal at the center of the weld.

It will of course be appreciated that the blank may be bent into the looped form shown in Figs. 1, 3, subsequent to shaping of the ends thereof, by any suitable bending machine as is well known in the art. Also, it will be appreciated that the bent link may then be fed into a resistance welding machine of any desired type for welding together the previously shaped ends of the blank. For example, as shown in Fig. 2, the blank may be set into a welding machine having push rams 16—18 adapted to exert appropriate compression forces against the opposite ends of the blank so as to push the ends of the blank into merging relationship, while at the same time the welding current is applied through electrodes as indicated at 19 (Figs. 2-3) so as to set up in the joint the necessary welding heat, as is also well known in the art.

However, it is a particular feature of the present invention that due to the novel shape and relationship of the apex end portions 14—15 of the link blank, they are forced by operation of the push rams of the welding machine initially into spot contact where the apexes 14—

15 cross, as indicated at 20 in Fig. 6. Thus, the welding operation starts at the exact center of the proposed weld, and then as the blank ends are forced further together the V-shaped end portions of the blank merge in novel manner while at the same time the zone of electrical contact floods radially outwardly from the center in four directions, as indicated by the progressive wave form lines 21, 22, 23 in Fig. 6. This action contributes to the formation of a perfect weld throughout the entire cross-section thereof because of the improved uniform distribution and conduction of heat from the center outwardly thereof. At the same time the ridge-shaped end portions of the blank plastically deform prior to complete abutments and interwelding thereof, so that the finished overall weld is of wave-like or sinuous plane form, as distinguished from the usual flat plane form of welds as produced by arrangements of the prior art.

Thus, the line of final abutting contact and welding between the opposite ends of the blank is of wave-like form, as indicated for example at 22 in Fig. 2, and at 24 in Fig. 4; and it will be appreciated that in the case of the finished weld of the present invention the total area of the weld is substantially greater than the cross-sectional area of the stock piece. Furthermore, in the case of the present invention the virgin metal at opposite sides of the weld, having been plastically deformed incidental to the welding operation, are in "geared" interlocked relation, thus mechanically reinforcing the weld.

It is a particular feature of the invention that by reason of the initially canted attitudes of the V-shaped end portions of the stock piece, and the subsequent conjoining thereof in squarely opposed but transverse axis relationship, the weld progresses in a novel manner from the center spot of initial contact between the apexes 14—15, progressively outwardly therefrom in four major radial directions. This action insures uniform heating throughout the weld zone and even filling of the weld zone; and this superior result is obtainable in the case of the present invention even though inaccuracies of manufacture may have resulted in substantial deviations in the stock piece end shapes from the dimensional and shape specifications therefor.

It will of course be appreciated that whereas only one form of the invention has been shown and described in detail, various changes may be made therein without departing from the spirit of the invention or the scope of the appended claims.

We claim:

1. A method of making a chain link which comprises, forming the opposite ends of a length of weldable metal bar into V-shaped form to present straight edge portions at the extremities of the bar which extend transversely thereof and which lie in separate, substantially perpendicular longitudinal planes, bending the bar into looped form so as to bring the opposite ends thereof into opposed abutting relation with the straight edge portions thereof disposed in transverse relationship to each other, and subjecting said end portions to welding temperature while pressing them together to plastically deform the V-shaped ends thereof while completing the weldment therebetween.

2. A method of making a chain link which comprises, forming the opposite ends of a length of weldable metal bar into tapered, ridge-like form to present transverse straight edge portions at the extremities of the bar which extend diametrically the full width thereof and which lie in separate substantially perpendicular planes passing through the longitudinal axis of said bar, bending said bar into looped form to bring the opposite ends thereof into opposed abutting relation with the straight edge portions disposed in substantially right angular relation to each other, and subjecting said end portions to welding temperature while pressing them together to plastically deform the V-shaped ends thereof while completing the weldment therebetween.

References Cited in the file of this patent
UNITED STATES PATENTS

| | | |
|---|---|---|
| 858,758 | Roehr | July 2, 1907 |
| 1,405,785 | Johnson | Feb. 7, 1922 |
| 2,021,157 | Stahl | Nov. 19, 1935 |